United States Patent
Shim et al.

(10) Patent No.: US 11,799,679 B2
(45) Date of Patent: Oct. 24, 2023

(54) SYSTEMS AND METHODS FOR CREATION AND APPLICATION OF INTERACTION ANALYTICS

(71) Applicant: Read AI, Inc., Seattle, WA (US)

(72) Inventors: David Shim, Seattle, WA (US); Elliott Waldron, Seattle, WA (US); Robert Williams, Seattle, WA (US)

(73) Assignee: Read AI, Inc., Seattle, WA (US)

( * ) Notice: Subject to any disclaimer, the term of this patent is extended or adjusted under 35 U.S.C. 154(b) by 0 days.

(21) Appl. No.: 17/692,555

(22) Filed: Mar. 11, 2022

(65) Prior Publication Data

US 2023/0291593 A1    Sep. 14, 2023

(51) Int. Cl.
| | |
|---|---|
| *G06F 15/16* | (2006.01) |
| *H04L 12/18* | (2006.01) |
| *G06V 40/20* | (2022.01) |
| *G10L 25/63* | (2013.01) |

(52) U.S. Cl.
CPC .......... *H04L 12/1831* (2013.01); *G06V 40/20* (2022.01); *G10L 25/63* (2013.01); *H04L 12/1818* (2013.01)

(58) Field of Classification Search
None
See application file for complete search history.

(56) References Cited

U.S. PATENT DOCUMENTS

| | | | | |
|---|---|---|---|---|
| 2015/0046233 | A1* | 2/2015 | Srulowitz | G06Q 10/06398 705/7.42 |
| 2016/0073054 | A1* | 3/2016 | Balasaygun | H04L 12/1813 348/14.08 |
| 2018/0025303 | A1* | 1/2018 | Janz | G16H 50/20 705/2 |
| 2019/0213522 | A1* | 7/2019 | Cong | G06Q 10/06393 |
| 2020/0380468 | A1* | 12/2020 | Crawford | H04L 67/55 |
| 2021/0042854 | A1* | 2/2021 | Hazy | G06F 21/6245 |
| 2021/0058264 | A1* | 2/2021 | Fahrendorff | H04L 12/1822 |
| 2021/0076002 | A1* | 3/2021 | Peters | H04N 7/152 |
| 2021/0264162 | A1* | 8/2021 | Reece | G06V 20/49 |
| 2021/0361227 | A1* | 11/2021 | Chou | A61B 5/7264 |
| 2022/0014571 | A1* | 1/2022 | Polish | G06N 20/00 |
| 2022/0078366 | A1* | 3/2022 | Dasdan | G06V 40/174 |
| 2022/0198779 | A1* | 6/2022 | Saraee | G06V 10/761 |
| 2022/0210514 | A1* | 6/2022 | McBeth | H04N 21/854 |

FOREIGN PATENT DOCUMENTS

WO    WO-2019246239 A1 *  12/2019  ............. A61B 5/164

* cited by examiner

*Primary Examiner* — Phyllis A Book
(74) *Attorney, Agent, or Firm* — Perkins Coie LLP; Sumedha Ahuja

(57) ABSTRACT

A method comprises receiving a set of data from at least one interaction, calculating, an audio score for any audio data received in the set of data, and calculating a video score for any video data received in the set of data. The audio score is joined with the video score to create an audiovisual score, and some subset of measurement, alert or recommendation is sent to a user, the set being based on the audiovisual score and configured to be displayed on a user device.

20 Claims, 5 Drawing Sheets

SYSTEMS AND METHODS FOR CREATION AND APPLICATION OF INTERACTION ANALYTICS

BACKGROUND

In a world where work environments are becoming increasingly remote, work meetings, the backbone of many employees' days, are relying more and more on video and audio interactions via video and audio feeds such as (but not limited to) video conferencing. Video conferencing, however, presents problems in participant engagement, participant morale, and employee productivity, and such problems can adversely affect the quality of not only an existing meeting, but of future meetings as well.

Multiple reasons exist for these problems. First, users participating on video monitors find it difficult to understand the more subtle forms of feedback they receive via a computer monitor, and so they cannot tell the extent to which a meeting is proceeding effectively. And once the meeting ends and participants log off from their video conferencing software, a meeting leader is unable to ask for immediate feedback to determine how a meeting was seen by the participants. In addition, a majority of meetings now have more than seven attendees, and so the ability to review and analyze each participant manually is extremely limited, even if the participant is adept at picking up on and understanding social cues through a video monitor.

A number of companies exist that provide transcription services for the audio part of meetings that can then recap the exact words spoken, along with the action items determined at the meeting. Using computer models, they are able to diarize conversations as well as to assign voices to people. Examples of these types of companies include Otter.ai, Fireflies.ai, Gong, and Chorus.ai, but are not good at recognizing social cues or determining the type and degree of participant engagement, and so cannot provide meaningful feedback for improving future meetings.

Thus, a need exists to enable meeting participants and meeting organizers to gauge in real time as well as post interaction how the meeting is going, and how the meeting went.

SUMMARY

Embodiments of the present invention involve systems and methods of improving or adjusting interactions, in real time or in the future, using analytics gleaned from an interaction.

In an embodiment, a set of data is received from an interaction, the set of data pertaining to an audio metric and/or a video metric. An audio score and/or a video score is then calculated, as applicable and based on the received set of data, using an audio processing model and/or a video processing model, as applicable. The audio score for any audio data received is then joined with the video score for any video data received, to create an audiovisual score. In an embodiment, at least one post processing methodology is applied to the audiovisual score to create at least one measurement, at least one alert, and/or at least one recommendation for an interaction (which can be the current interaction, a series of past interactions, or a future interaction or interactions). These results of the post processing methodology can then be sent, in whole or in part, to a user device for display on that device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

Embodiments of the invention include generation of meeting-relevant interaction models based on a fusion of sensing inputs, including both video and audio inputs. More specifically, embodiments of the invention can include receiving audiovisual data from an interaction, and sending those received inputs to be analyzed according to various models for some or all of a variety of factors, including (but not limited to) face sentiment, laughing, text sentiment, face orientation, face movement, video on/off status, and talking status. Once those models operate on the received data, each factor is given a score by the model. The scores are then aggregated or combined to provide a sentiment score or an engagement score that pertains to a participant (or participants), or that pertains to the meeting itself. Once the scores are combined, in an embodiment, metrics, alerts or recommendations can be fed back to a user, who may be a participant, or who may not be a participant in the interaction.

In addition, in an embodiment, the meeting score can be fed into a model for a variety of additional analyses including a realtime analysis of an interaction, a post-interaction analysis for analysis of a specific interaction, a longitudinal analysis that can compare the score of an interaction with scores from historical interactions (for example, but not the only example, a series of team meetings), or can include that score in the aggregate score from historical interactions, and also an enterprise analysis, which can provide an analysis of the meeting to other meetings within the enterprise, or can include that score in the aggregate score from meetings within a single enterprise. In an embodiment, these additional analyses can be used to better understand the interaction or set of interactions (as applicable), and can be used to generate metrics, alerts, and recommendations that can be stored and/or sent to a user.

Figure 1:
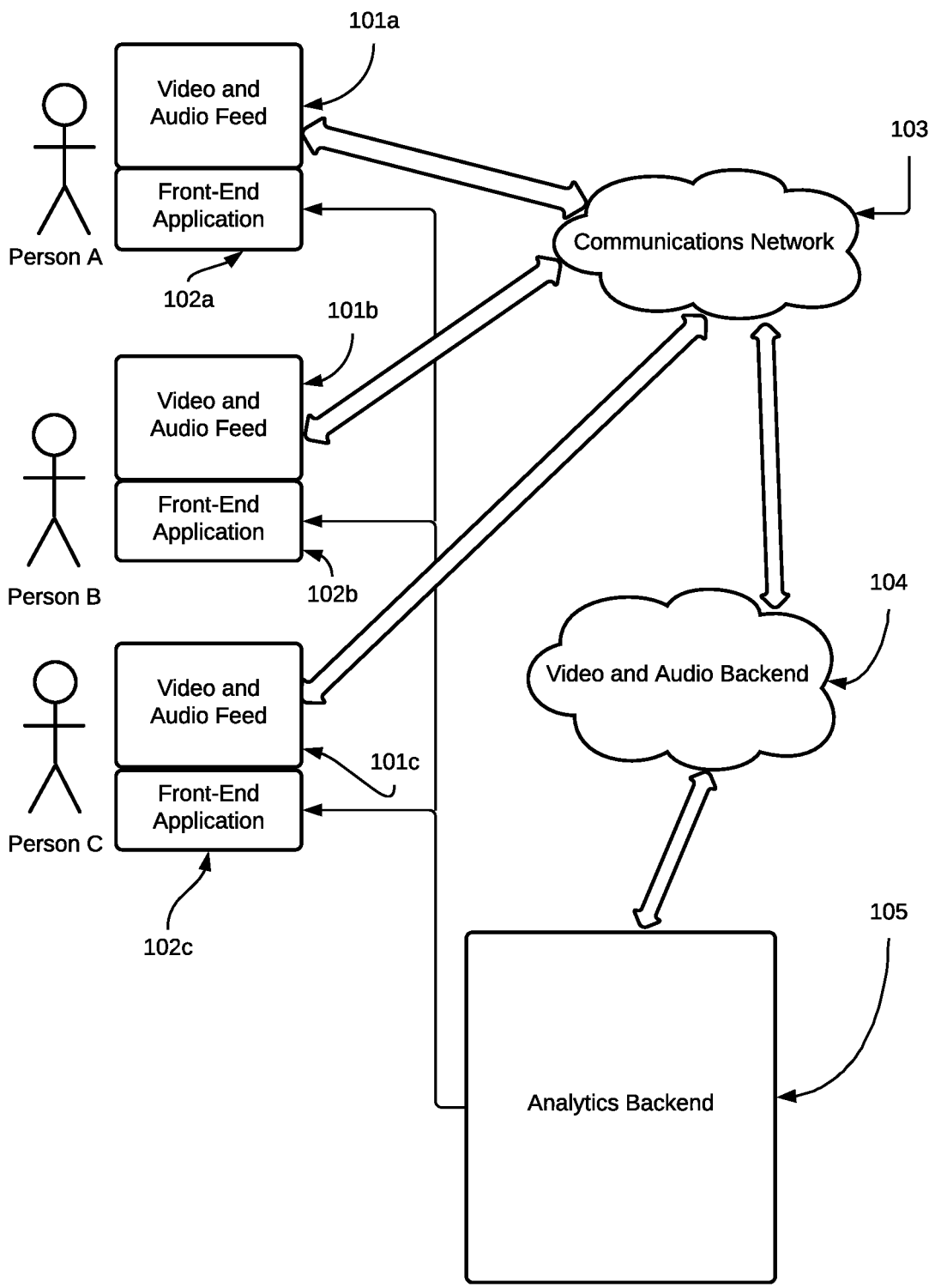
FIG. 1 is a block diagram of a system for providing a systems and method for creation and application of interaction analytics, according to an embodiment of the invention.

FIG. 1 is a block diagram of a system for providing a systems and method for creation and application of interaction analytics in the context of a video and audio feed, according to an embodiment of the invention. In an embodiment, the users are connected to one another via a communication network such as the Internet. In the interaction shown in FIG. 1, persons A, B, and C are each connected to communications network 103 via interaction applications 101a, 101b, and 101c, respectively. Through such network 103, they are each connected to one another via interaction backend 104.

Interaction applications 101a, 1010b, and 101c can be, for example, any computer-based application for a video and audio feed (for example, but not the only example, a video conferencing application) in which the application collects audio or video or audiovisual data. One skilled in the art will understand that for the purpose of the present invention, an interaction can be a video & audio feed, a video conference, a telephone call, a live conversation or meeting (in which case video and audio backend 104 connecting the various participants in the interaction may not be necessary).

In the ease of a video and audio feed among the various users (in this case, Persons A, B, and C), communication network 103 can be any communications network configurable to allow an interaction (e.g., a video conference) among a plurality of users, and to allow the plurality of users (e.g., Persons A, B, and C) to communicate with video and audio feed backend 104. Communication network 103 can be any network or combination of networks capable of transmitting information (e.g., data and/or signals) and include, for example, a telephone network, an Ethernet network, a fiber-optic network, a wireless network, and/or a cellular network. In some embodiments, communication network 103 can include multiple networks operatively coupled one to another by, for example, network bridges, routers, switches and/or gateways. For example, video and audio feed applications 101a, 101b, and 1010c can be operatively coupled to a cellular network, an Ethernet network, or a fiber-optic network. The cellular network, Ethernet network and fiber optic network can each be operatively coupled to one to another via one or more network bridges, routers, switches and/or gateways such that the cellular network, the Ethernet network and the fiber-optic network are operatively coupled to form a communication network. Alternatively, for example, the cellular network, the Ethernet network, and the fiber-optic network can each be operatively coupled to the Internet such that the cellular network, the Ethernet network, the fiber-optic network and the Internet are operatively coupled to form a communication network.

As stated above, to complete the interaction, the users are connected to one another via a video and audio feed 104, which can act as a hub for providing audio data, video data, or audiovisual data to each of Persons A, B, and C to fulfill the interaction.

In an embodiment, video and audio feed backend is in communication with the analytics backend 105, where video and audio data can be passed and analyzed. Once analyzed, certain information about the video and audio is calculated, and the information, which can include alerts or suggestions, are passed back to one or more users to learn more about the video and audio, about the users, and about the meeting itself. In an embodiment, at least one of Persons A, B, and C have a client side interaction application displayed on their device, where the interaction application can display analytics or other messages related to the interaction. In an embodiment, one or two or all of the participants in an interaction may receive messages from the analytics backend 105, or a user who is not shown as taking part in the video and audio may receive the information. In an embodiment, the information is received in real time. In an embodiment, the information is received after the interaction has ended.

Figure 2:
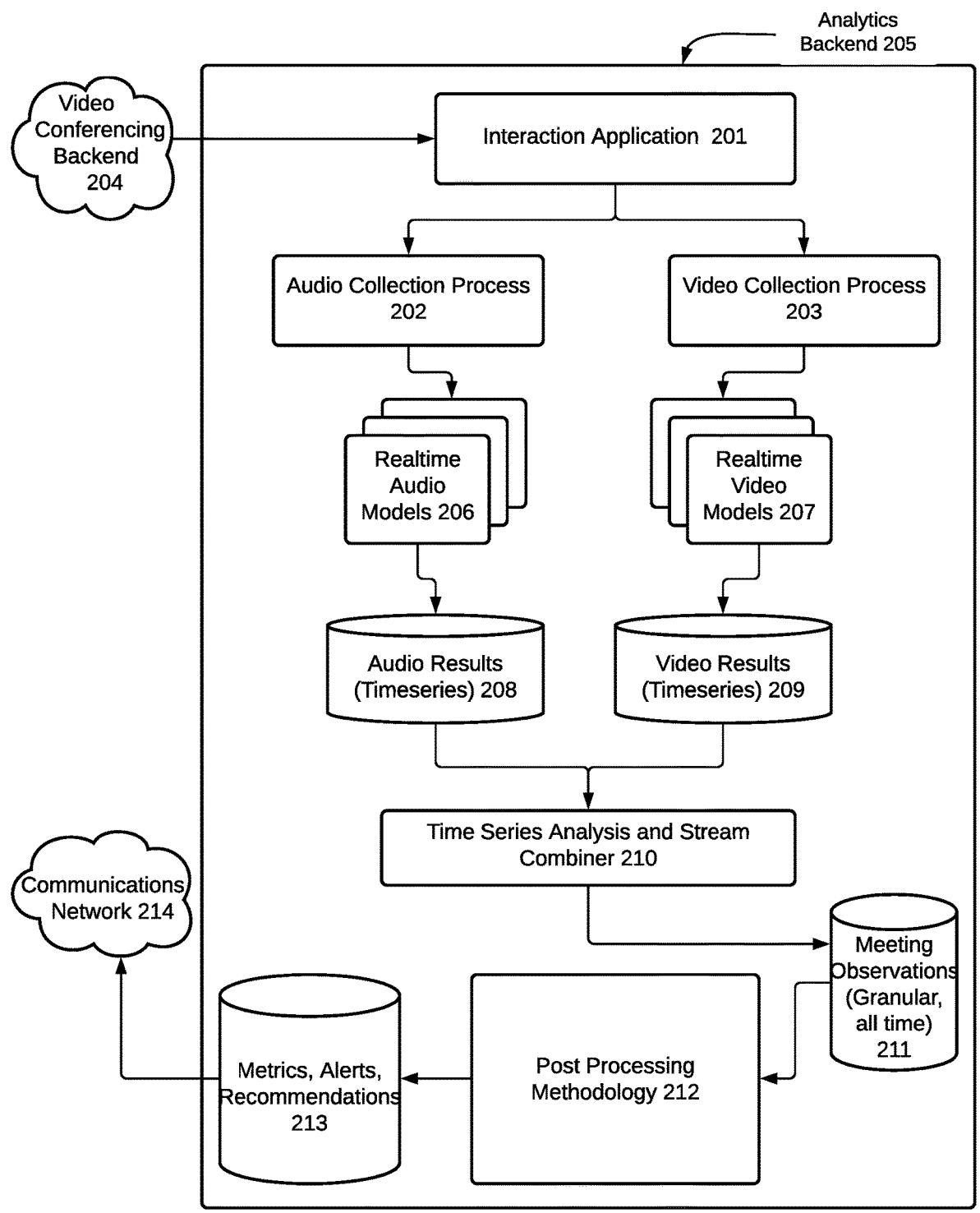
FIG. 2 is a block diagram of system that provides a backend that provides analytics calculations for the system in FIG. 1, according to an embodiment of the invention.

FIG. 2 is a block diagram of system displaying a back end that provides analytics calculations for interactions, according to an embodiment of the invention. In an embodiment, analytics backend 205 receives audiovisual data, which can include a set of audio data (a representation of sound), a set of video data (a representation of images), or a set of both audio and video data. For the purposes of the present invention, one skilled in the art will understand that a set can include data, or can be a null set, including no data. Thus, audiovisual data may be a combination of audio and video data, or may only be audio data, or may only be only video data.

In an embodiment, audiovisual data is received at analytics backend 205 via interaction application 201. Interaction application can be any application that can be used for sending and receiving data into and from (respectively) analytics backend 205. In an embodiment, for audio data received, the interaction application 201 can be configured to play meeting audio through a virtual audio device which is an audio bridge application that transmits audio data from the interaction application 201 to the audio collection process 202. While the audio is playing, a separate process is run that captures discrete windows of audio and transmits them to the realtime audio models 206 for further processing on a processor. In an embodiment, realtime audio models are configured to perform functions including (but not limited to) signal quality analysis, transcription and subsequent textual sentiment analysis, voice prosody analysis, speaker diarization and an analysis of the topic or topics covered in the interaction.

For video data that is received, video data is identified and video collection process 203 and sent to realtime video models 207, which analyze aspects of the audio and video data, to determine certain information about the user. In an embodiment, the interaction application (201) is configured to display the meeting contents on a virtual video display which is a bridge application that transmits video data from interaction application 201 to the video collection process 203. While this video is being displayed on a virtual device, a separate process is run to capture static screenshots at a configurable frequency to produce a sample of the video stream. These static screenshots are then transmitted to the realtime video models (207) for further processing by a processor or processors. In an embodiment, realtime video models 207 are configured to perform functions including, but limited to, video signal quality analysis, facial sentiment and engagement analysis on a viewport-by-viewport basis, and scene parsing, including viewports detection, face detection, name character recognition, mute state, talking state, and platform feedback (e.g., icons). In an embodiment, a viewport is a window (within a video and audio feed display or otherwise) that indicates that presence of one or more participants and may support realtime video of one or more participants.

One skilled in the art will understand that the term "processor" can mean a single component, or multiple components, and the components may be responsible for a variety of functionality within the system. Thus, a processor can be any of a variety and combination of processors, and can be distributed among various types and pieces of hardware, or even across a network. Such processors can be implemented, for example, as hardware modules such as embedded microprocessors, microprocessors as part of a computer system, Application Specific Integrated Circuits (ASICs), and Programmable Logic Devices ("PLDs"). Some such processors can have multiple instruction executing units or cores. Such processors can also be implemented as one or more software modules in programming languages as Java™, C++, C, assembly, a hardware description language, or any other Suitable programming language. A processor according to some embodiments includes media and computer code (also can be referred to as code) specially designed and constructed for the specific purpose or purposes.

For example, the realtime audio models can determine a user's face sentiment (e.g., is the user's face happy, angry, etc.), whether a user is laughing, whether the user's speech reflects certain emotions such as anger, or other sentiments. The realtime video models, for example, can determine a user's face orientation, a user's face movement, whether a user's video is off, whether a user is talking, and others.

In an embodiment, the output of the realtime audio and video models are aggregated into a data structure that can include moment-by-moment estimates of the various model outputs. For example, at the start of a hypothetical finance committee meeting, participants may be casually discussing their weekend plans and sentiment and engagement are measured as high, but once the business of the meeting starts sentiment declines because the topic shifts to poor financial performance.

Once results are received as outputs from the model, they can be stored as time-dependent data in audio database 208 and video database 209, which are operatively coupled to a processor that, from a functional standpoint, acts as a time series analyzer and a stream combiner 210.

Time series analyzer and stream combiner 210 output the combined results of the audio and video analysis (where both audio and video analysis exist), which are then stored in meeting observations database 211, which acts to store the results calculated for that particular interaction. In an embodiment, when only a single channel of audio is available, an additional function of this step is to fuse the video and audio results to enable multimodal speaker diarization (i.e., who spoke when) so that the single audio stream can be assigned to individual participants in an interaction.

In an embodiment, meeting observations database 211 can store results from all or some past interactions, such that the results from a subset of all interactions can be fed into post-processing methodology processor 212 for aggregation and user messaging. Post-processing methodology processor 212 can calculate metrics, alerts, and recommendations to be sent to users. Such metrics, alerts, and recommendations can include participant sentiment, interaction sentiment, interaction engagement, and participant engagement, and can include data from a single ongoing interaction, multiple ongoing interactions, a single historical interaction, or multiple ongoing interaction, or any permutation of such interactions. The various calculated sentiments and engagements can be aggregated into an overall interaction score.

In an embodiment, database 213 is used to store the calculated metrics, alerts and recommendations, ultimately to be sent to a user via network 214.

Figure 3:
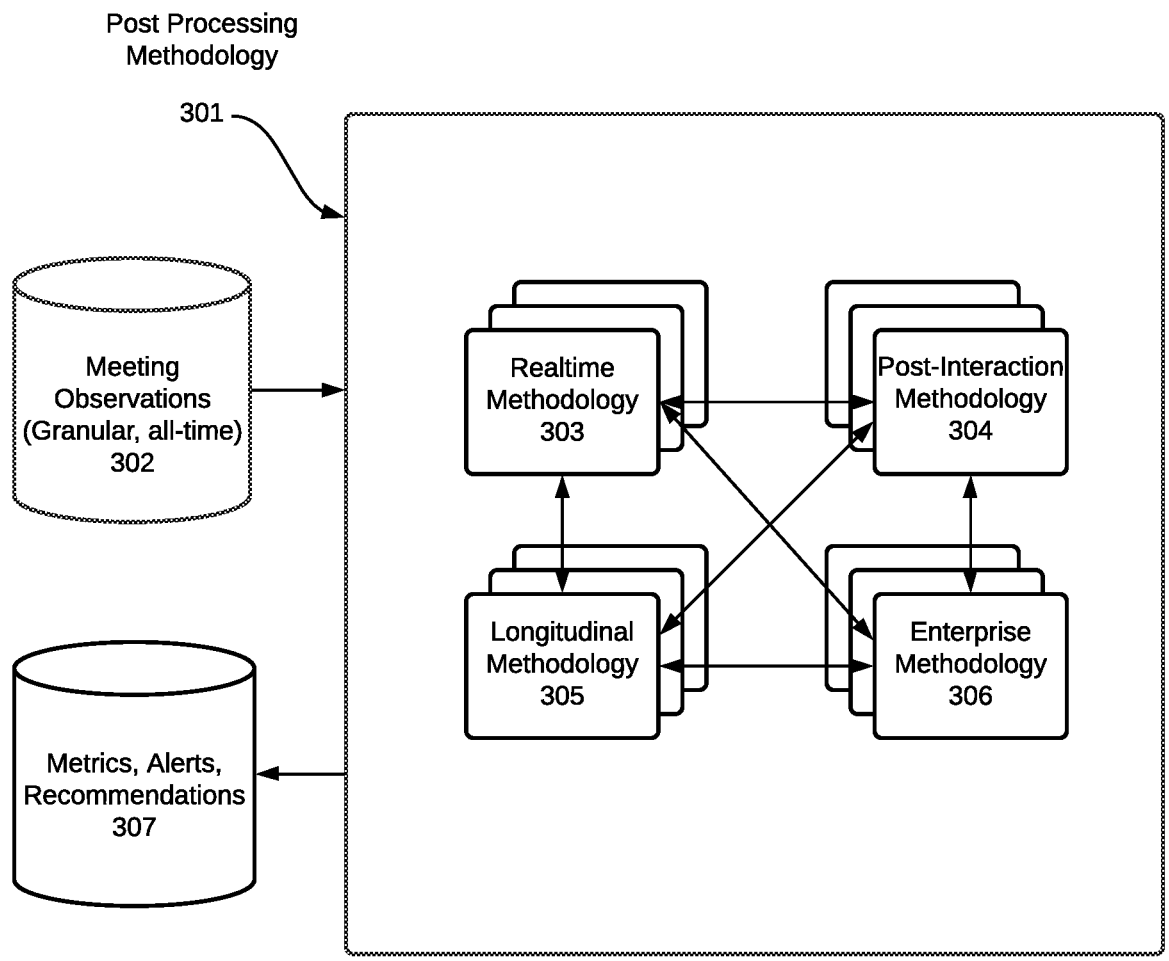
FIG. 3 is a block diagram of a system that provides post processing methodology for the backend in FIG. 2.

FIG. 3 is a block diagram of a system that provides post processing methodology for the back end in FIG. 2. In an embodiment, once the interaction results are received from meeting observations database 302 (which is the same as meeting observations database 211), they can be sent to a processor for aggregation according to the post processing methodology desired.

The post processing module 301 comprises a processor or processors that aggregate meeting observations that can be used to generate metrics, alerts, or recommendations for users. In an embodiment, the processor can apply a realtime methodology 303 that creates metrics, alerts, or recommendations for ongoing interactions in real time. In an embodiment, the processor can apply a post-interaction methodology 304 that generates metrics, alerts, or recommendations for an interaction after the interaction ends. With either the realtime methodology or post-interaction methodology, the aggregation and analysis can be limited to a single meeting, or can be combined by other meetings to generate metrics, alerts, and recommendations that use historical data.

In an embodiment, the post processing methodology 301 can calculate results using a longitudinal methodology 305 to perform a longitudinal analysis of future and past meetings, looking for trends and consistencies that pertain to meeting quality, and that can provide results from comparing interactions from similar meetings, or from a series of meetings. For example, post processing methodology 301 can calculate the efficacy of past sessions of a recurring meeting, and if the metrics are poor, the user can receive a cue or a suggestion related to the cost of keeping such meetings on the calendar.

In an embodiment, the post processing methodology 301 can calculate results using an enterprise methodology 306 that can provide results from comparing interactions across an enterprise.

In an embodiment, database 307 is configured to store aggregate metrics on a per-meeting basis as well alerts and recommendations derived from certain events (e.g., sudden drop in engagement) that occur over the course of a given interaction as well as events that occur repeatedly over multiple interactions (e.g., you reliably show up late).

Figure 4:
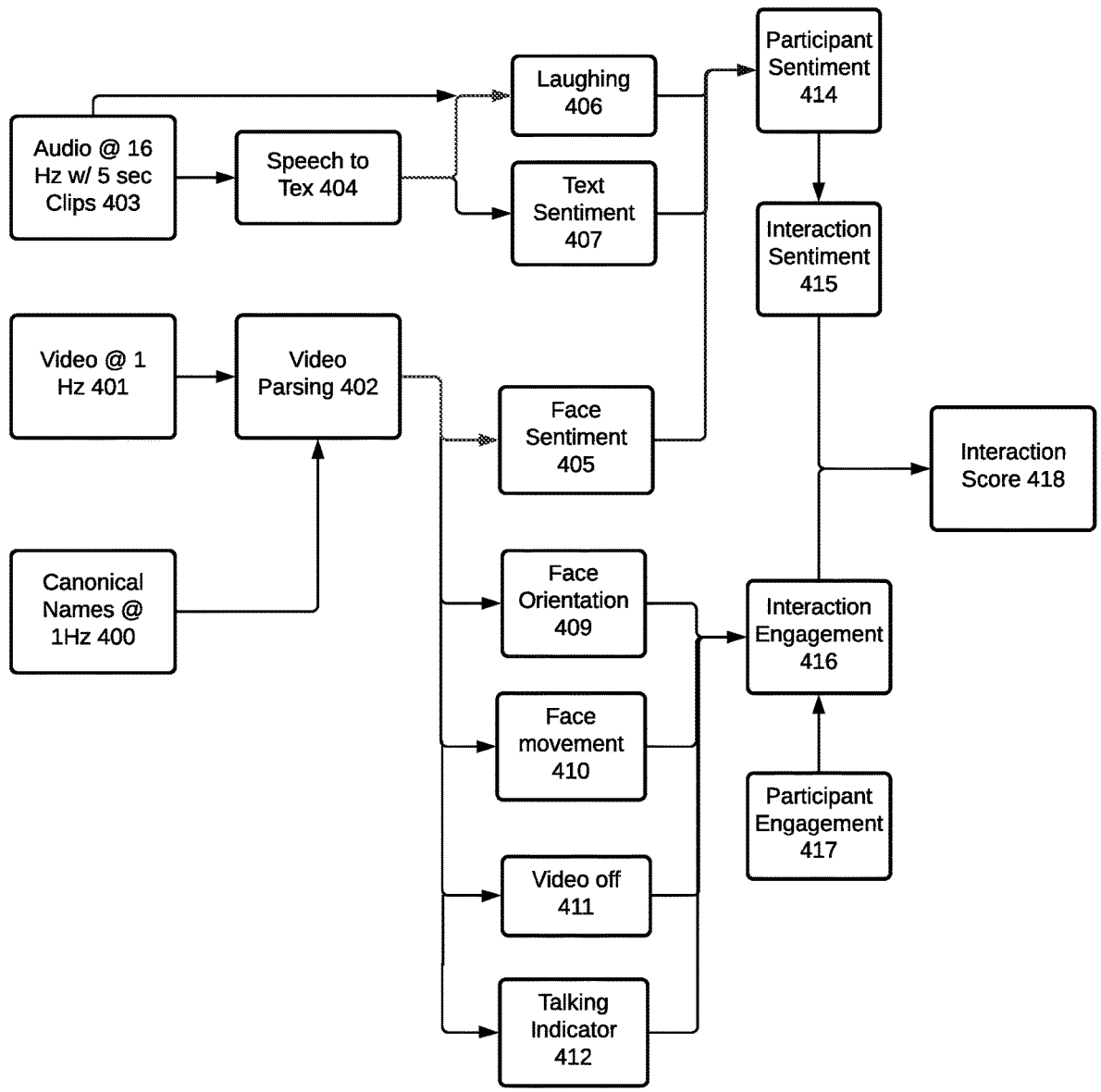
FIG. 4 is a block diagram of a functional representation of metric aggregations used in calculations by the System in FIGS. 1 and 2.

FIG. 4 is a block diagram of the analyzed aspects of the audio and video data, and is also of a functional representation of metric aggregations used in calculations by the System in FIG. 1. As shown in FIG. 4, in an embodiment, received, a list of canonical names 400 can be received to determine who are participants in the interaction. In addition, at 401, video can be collected via a video camera at a sampling rate of 1 Hz throughout the interaction, and is parsed into independent samples in 402. In an embodiment, the samples are viewport level. In an embodiment, the samples are participant level. In an embodiment, the samples are a combination of viewport level and participant level. The video parsing takes the raw video samples and identifies the individual participant viewports. In an embodiment, the video is parsed for a user's face orientation 409, face movement 410, whether the user's video is off at 411, whether the user is talking 412, or any combination of these aspects.

In an embodiment, at 403, audio data can be collected via a microphone and sampled at 16 Hz in, for example 5-second audio clips sampled throughout the interaction, converted to text at 404 for further analysis such as textual sentiment modeling and topic analysis, and the audio is analyzed to determine whether a user is laughing 406, or a user's text sentiment 407. In an embodiment, any combination of these analyses can be performed and used. Once the audio and video are analyzed, a quantitative model (e.g., a statistical machine learning model, an artificial intelligence model, a deep learning model, or a machine learning model) is applied to them and the results of the analysis are sent for post-processing aggregation and scoring. Once the post-processing aggregation is complete, the processor generates metrics, alerts, or recommendations for the user or users.

Once the video parsing 402 is performed, a participant visual feature analysis can be performed based on the participant-level video parsed from the raw video feed. For a given meeting or series of meetings, some or all of the following features may be analyzed:

In an embodiment, the video content is analyzed to determine a participant's face sentiment at 405. In an embodiment, the participant's face sentiment may be analyzed based on an AI model trained to detect positive vs. negative emotions of a given face. In an embodiment, this composite model first uses a deep learning based network model to detect the presence of a face in a viewport window and feeds the cropped face image to another deep learning based network model to determine the participant's emotions.

In an embodiment, face orientation and movement 406 are analyzed. These analyses look at the detected face in a viewport and, using programmed knowledge about faces, can determine whether the participant is looking at the camera, or an off-camera screen, as well as provide an estimate of the amount of head movement (e.g., head nods & shakes) over time. These calculations can then be used as inputs to calculate, for example, participant-level engagement metrics.

In an embodiment, text sentiment 407 can be analyzed by taking the textual output of the speech to text model, and by applying a text sentiment model to estimate the positive or negative tone of the conversation.

Other visual features that can be analyzed include name recognition, mute status, video-on status, talking status, and the presence of a feedback icon (for example, a thumbs up emoji or clapping emoji as is sometimes facilitated by a video and audio feed platform).

Once the audio parsing 403 is performed, a participant audio feature analysis can be performed based on the participant-level audio parsed from the raw audio feed. For a given meeting or series of meetings, some or all of the following features may be analyzed:

In an embodiment, the model can determine whether a participant is laughing 406. In an embodiment, this is performed by receiving raw audio clips, and applying a laugh detection model to be used in the analysis of a participant's sentiment (for example, laughing can indicate a positive sentiment).

Once the participant feature analyses are performed on the video and audio aspects of an interaction, a participant sentiment and engagement metrics analysis can be performed. In an embodiment, a participant sentiment analysis provides a metric that measures the positive vs. negative emotional state of a given participant and is an aggregation of the following inputs that are weighted to increase the accuracy against a human labeled dataset, including, but not limited to, face sentiment, laughter, textual sentiment, and voice prosody. In an embodiment, a participant engagement analysis can be used to provide a metric that measures the level of attention to the interaction of a given participant, and is an aggregation of some or all of the following inputs that are weighted to increase the accuracy against a human labeled dataset, including head orientation and movement, a video-on and muted status, a talking status, and a turn taking status.

While the metrics above are specific to a given participant, interaction sentiment and engagement metrics can be calculated to provide metrics for some or all participants in a given interaction. In an embodiment, interaction sentiment 415 can be calculated as an aggregation of the participant level sentiment measured across an interaction. The various participant-level metrics can be weighted in such a way as to maximize the accuracy of the interaction-level metric against a human labeled dataset.

In an embodiment, an interaction engagement metric 416 can be calculated as an aggregation of the participation level engagements measured across an interaction. The various participant-level metrics can be weighted in such a way as to maximize the accuracy of the interaction-level metric against a human labeled dataset.

Finally, in an embodiment, an interaction score 418 can be calculated by combining a combination of calculated sentiments and engagements, to determine the overall effectiveness of the interaction. The input metrics can be weighted in such a way as to maximize the accuracy of the interaction-level metric against a human-labeled dataset.

Figure 5:
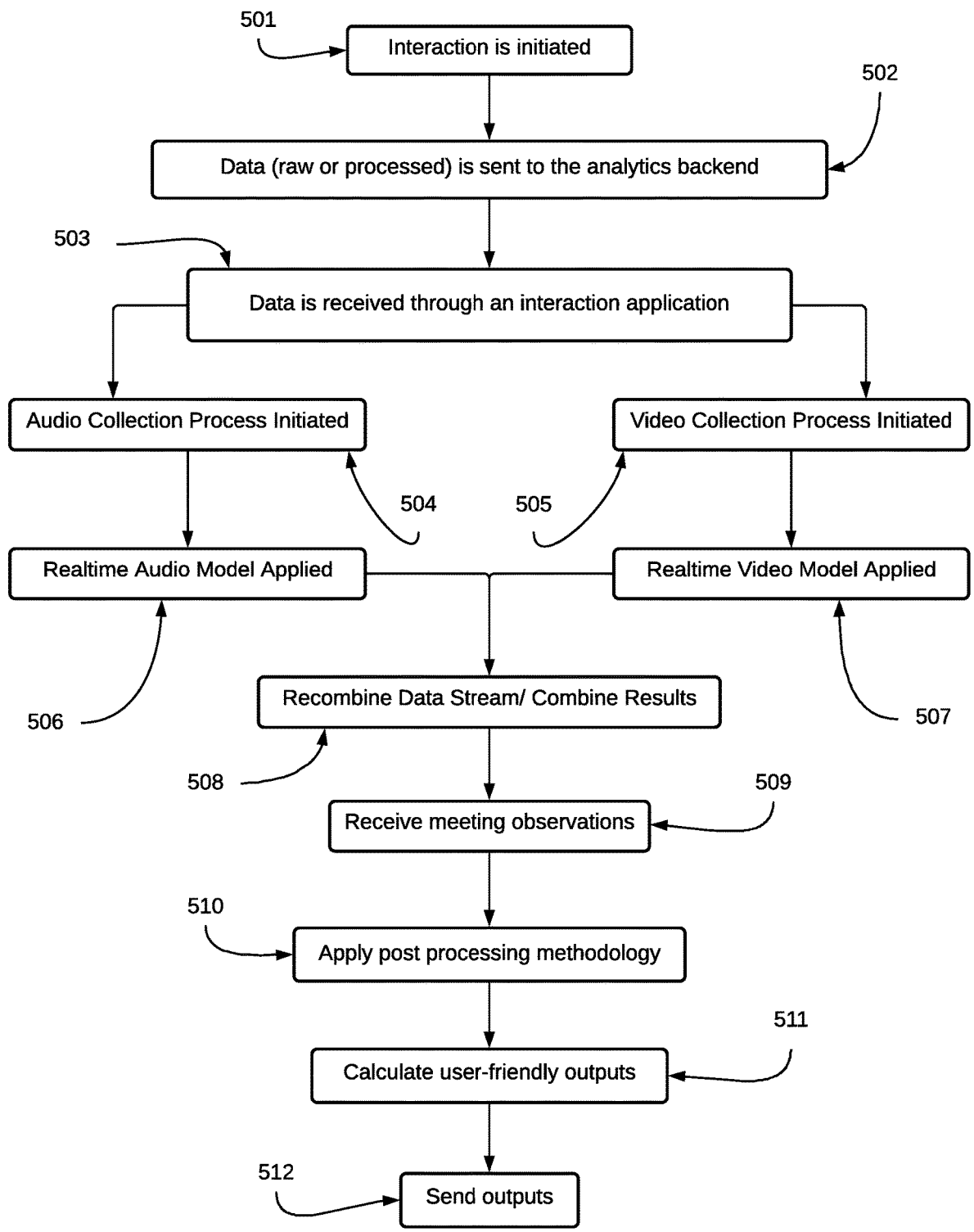
FIG. 5 is a flowchart of a method for calculating interaction outputs according to an embodiment of the invention.

FIG. 5 is a flowchart of a method for calculating interaction outputs according to an embodiment of the invention. At 501, an interaction is initiated. An interaction can include any interaction between a plurality of users, and can include online interactions (e.g., videoconferencing), or any other network-based interaction (e.g., a telephone call), or can be an in-person interaction (e.g., a physical in-person meeting) or a hybrid of online and physical meeting (e.g., a meeting where some participants are in a conference room).

Once the interaction is initiated, audiovisual data is captured and sent via a network to an analytics backend at 502. This can be done through any known method such as using a video camera to capture video, and using a microphone to capture audio.

At 503 the data is received by the interaction backend via an interaction application SDK, and once received, the audio collection process is initiated at 504 which peels off the audio data and sends it to the realtime audio model at 506, where the various aspects of audio data are processed and scored. Examples (but not the only examples) of audio aspects being processed and scored include whether a user is laughing, and a user's text sentiment.

At 505, video data is peeled off the received data and sent, at 507, to the realtime video model where various aspects of video data are processed and scored. Examples (but not the only examples) of video data include face sentiment, face orientation, face movement, whether a user's video is off, or whether a user is talking.

At 506 and 507, the audio data and video data, respectively, are applied a score based on a time stamp within the data, and at 508, the audio and video streams are recombined to a single stream with their time stamps matching up, so a score can be viewed over time for each of the analyzed audio and video aspects.

At 509, these scores, or observations, are sent to a database, which provides them to a processor at 510 for post processing aggregation. Once the data is aggregated and analyzed at 510, then at 511, the processor can calculate user-friendly outputs, such as metrics, alerts, and recommendations. The outputs can be presented in real time, or can be presented after the meeting to determine the efficacy of that meeting, or of a series of meetings.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of data or components described in relation to certain processes can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

We claim:

1. A method comprising:
   receiving a set of data from at least one interaction;
   calculating, based on at least one audio processing model for at least one audio metric, an audio score for any audio data received in the set of data;
   calculating, based on at least one video processing model for at least one video metric, a video score for any video data received in the set of data;
   joining the audio score for any audio data received with the video score for any video data received to create an audiovisual score;
   applying a post processing methodology to the audiovisual score,
      wherein the post processing methodology includes at least one of: a longitudinal analysis of future meetings, a longitudinal analysis of past meetings, an enterprise analysis of future meetings, or an enterprise analysis of past meetings; and
   sending at least one measurement, alert, or recommendation to a user, the at least one measurement, alert, or recommendation being based on the post processing methodology for an interaction,
      wherein the at least one measurement, alert, or recommendation is configured to be displayed on a user device.

2. The method of claim 1,
   wherein the set of data includes time sequence information for the interaction, and
   wherein joining the audio metric score and the video metric score is based on the time sequence information.

3. The method of claim 2,
   wherein the audio metric includes at least one of a laughing metric, a text sentiment metric, a talking indicator metric, a topic metric, a voice prosody metric, a speaker embedding vector, an agreement metric, a question metric, a statement metric, or a request for action metric; and
   wherein the video metric includes at least one of a visual engagement metric, a visual sentiment metric, a visual emotion metric, a visual face movement metric, an is muted metric, an is talking metric, a feedback icon metric, a face key points vector, an in presentation/screen share metric, a head nodding metric, a head shaking metric, or a video off metric.

4. The method of claim 1, wherein the at least one measurement, alert, or recommendation is based on at least one of a participant sentiment measurement, an interaction sentiment measurement, a participant engagement measurement, or an interaction engagement measurement.

5. The method of claim 1, wherein the post processing methodology pertains to a single interaction.

6. The method of claim 1, wherein the post processing methodology includes audiovisual scores from at least one historical interaction.

7. The method of claim 1, wherein the post processing methodology includes an aggregation of a plurality of metrics pertaining to at least one of interactions over time, meetings, or participants.

8. The method of claim 1, wherein the at least one measurement, alert, or recommendation is configured to be displayed in real time.

9. The method of claim 1, wherein the at least one measurement, alert, or recommendation is aggregated for a post interaction review.

10. The method of claim 1, wherein the at least one measurement, alert, or recommendation is aggregated for a post interaction review.

11. A system comprising:
    a network interface configured to receive a set of data from at least one interaction;
    a processor configured to:
       calculate, based on at least one audio processing model for at least one audio metric, an audio score for any audio data received in the set of data;
       calculate, based on at least one video processing model for at least one video metric, a video score for any video data received in the set of data;
       join the audio score for any audio data received with the video score for any video data received to create an audiovisual score;
       apply at least one post processing methodology to the audiovisual score to create at least one of a measurement, an alert, or a recommendation, for an interaction, the at least one measurement, alert, or recommendation configured to be displayed on a user device wherein the post processing methodology includes at least one of: a longitudinal analysis of future meetings, a longitudinal analysis of past meetings, an enterprise analysis of future meetings, or an enterprise analysis of past meetings; and
       send the at least one measurement, alert, or recommendation to a user,
          wherein the at least one post processing methodology including at least one of a longitudinal analysis and an enterprise analysis.

12. The system of claim 11,
    wherein the set of data includes time sequence information for the interaction; and
    wherein the system is further configured to join the audio metric score and the video metric score is based on the time sequence information.

13. The system of claim 11,
    wherein the audio metric includes at least one of: a laughing metric, a text sentiment metric, a talking indicator metric, a topic metric, a voice prosody metric, a speaker embedding vector, an agreement metric, a question metric, a statement metric, or a request for action metric; and wherein the video metric includes at least one of: a visual engagement metric, a visual sentiment metric, a visual emotion metric, a visual face movement metric, an is muted metric, an is talking metric, a feedback icon metric, a face key points vector, an in presentation/screen share metric, a head nodding metric, a head shaking metric, or a video off metric.

14. The system of claim 11, wherein the at least one measurement, alert, or recommendation is based on at least one of a participant sentiment measurement, an interaction sentiment measurement, a participant engagement measurement, or an interaction engagement measurement.

15. The system of claim 11, wherein the post processing methodology pertains to a single interaction.

16. The system of claim 11, wherein the post processing methodology includes audiovisual scores from at least one historical interaction.

17. The system of claim 11, wherein the post processing methodology includes an aggregation of a plurality of metrics pertaining to at least one of interactions over time, meetings, or participants.

18. The system of claim 11, wherein the at least one measurement, alert, or recommendation is configured to be displayed in real time.

19. The system of claim 11, wherein the at least one measurement, alert, or recommendation is aggregated for a post interaction review.

20. The system of claim 11, wherein the at least one measurement, alert, or recommendation is aggregated for a post interaction review.

* * * * *